(12) United States Patent
Chu

(10) Patent No.: US 6,489,596 B2
(45) Date of Patent: Dec. 3, 2002

(54) QUANTITATIVE COOKING DEVICE

(76) Inventor: Li-Tsan Chu, 2 Floor, No. 15, Lane 81, Kwuang-Fu S. Rd., Taipei (TW)

( * ) Notice: Subject to any disclaimer, the term of this patent is extended or adjusted under 35 U.S.C. 154(b) by 0 days.

(21) Appl. No.: 09/759,836

(22) Filed: Jan. 9, 2001

(65) Prior Publication Data

US 2002/0088795 A1 Jul. 11, 2002

(51) Int. Cl.$^7$ .................................. H05B 1/02
(52) U.S. Cl. ................ 219/518; 219/454; 219/494; 219/708; 426/243; 99/325
(58) Field of Search ........................ 219/711, 518, 219/457, 497, 459, 494, 501, 464, 708, 710; 374/14; 73/76; 99/451, 325; 426/243

(56) References Cited

U.S. PATENT DOCUMENTS

| | | | | |
|---|---|---|---|---|
| 4,591,684 A | * | 5/1986 | Tanabe et al. | 219/10.55 B |
| 4,998,001 A | * | 3/1991 | Cigarini et al. | 426/243 |
| 5,958,272 A | * | 9/1999 | Taplan et al. | 219/464 |
| 5,983,711 A | * | 11/1999 | Pappas et al. | 73/76 |

FOREIGN PATENT DOCUMENTS

EP 209201 * 1/1987 ................. 219/711

* cited by examiner

*Primary Examiner*—Mark Paschall
(74) *Attorney, Agent, or Firm*—Troxell Law Office PLLC

(57) ABSTRACT

Quantitative cooking device including an electronic scale, a heater disposed on the electronic scale and a container to be heated by the heater. The heater is electrically connected with the electronic scale which controls powering on/off of the heater. The electronic scale compares the measured actual weight with the preset value. When the measured actual weight is equal to the preset value, the heater is powered off to stop heating the container. Therefore, the cooking will be stopped in accordance with the preset value and a quantitative cooking effect is achieved.

10 Claims, 2 Drawing Sheets

QUANTITATIVE COOKING DEVICE

BACKGROUND OF THE INVENTION

The present invention is related to a quantitative cooking device, and more particularly to a quantitative cooking device which compares a preset value with the measured actual weight of the cooked foods so as to control and determine whether the heating should be continued.

When boiling herbal medicines or stewing foods with a stewing cooker, the heating time is generally controlled in accordance with experience. The foods can be well-done or a proper amount of water will remain in the cooker by means of properly controlling the stewing time. For example, when boiling herbal medicines, a certain amount of water is added to herbal medicines and boiled until the water is vaporized into a thick liquid herbal medicine. In such boiling procedure, the boiling time is very hard to control. In case the amount of the liquid medicine left in the cooker is different from the expected amount, the curing effect of the herbal medicine will be greatly deteriorated. In addition, when heated, it is necessary for a user to stay by the cooker and frequently open the cooker cover to check the amount of water. Otherwise, the water will be exhausted and a fire may take place.

An improved timing cooker has been developed. Such timing cooker enables a user to set the heating time. However, the time must be set in accordance with the amount of added water and only an experienced user can properly set the heating time. Otherwise, the foods still will be under-done or over-done.

SUMMARY OF THE INVENTION

It is therefore a primary object of the present invention to provide a quantitative cooking device which compares a preset value with the measured actual weight of the cooked foods so as to control and determine whether the heating should be continued. Therefore, the cooking will be stopped in accordance with the preset value and a quantitative cooking effect is achieved.

According to the above object, the quantitative cooking device of the present invention includes a container, a heater and an electronic scale.

The container is placed on the heater to be heated and foods to be cooked are placed in the container.

The heater is placed on a scale pan of the electronic scale for heating the container. The heater is electrically connected with the electronic scale which controls powering on/off of the heater.

The electronic scale via the pressure of the scale pan measures the corresponding actual weight. By means of a controlling panel of the electronic scale, a weight value is preset for cutting off the power as necessary in cooking foods. When the measured actual weight is larger the preset value, the heater is continuously powered on, while when the measured actual weight is equal to the preset value, the heater is powered off to stop heating the container. Therefore, a quantitative cooking effect is achieved in accordance with the preset value.

The present invention can be best understood through the following description and accompanying drawings wherein:

DETAILED DESCRIPTION OF THE PREFERRED EMBODIMENT

Figure 1:
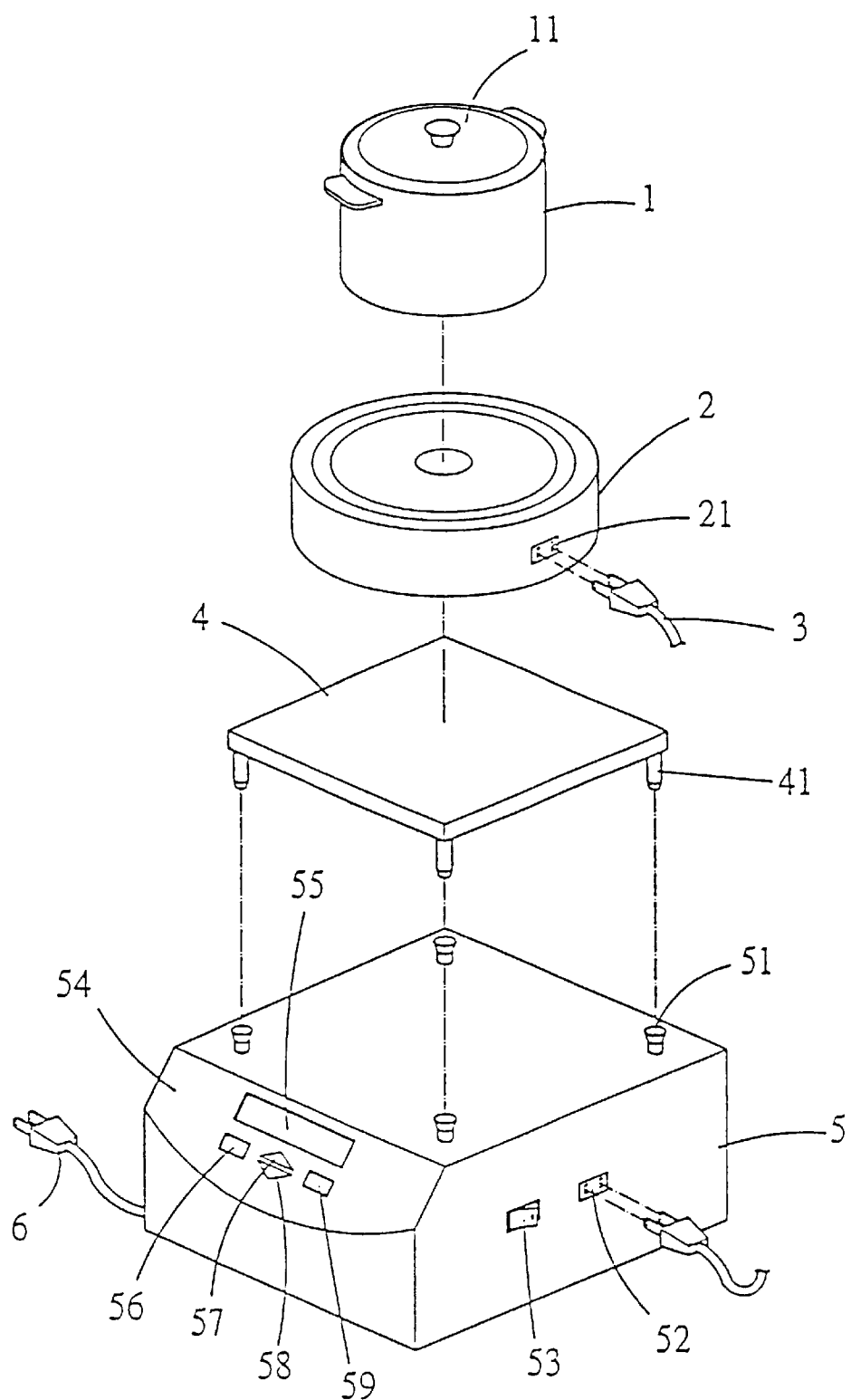
FIG. 1 is a perspective exploded view of the quantitative cooking device of the present invention.

Please refer to FIG. 1. The quantitative cooking device of the present invention includes a cooker 1, an electric oven 2 and an electronic scale 5.

The cooker 1 is placed on the electric oven 2 to be heated. The foods to be cooked are placed in the cooker 1. A cooker cover 11 serves to cover the cooker 1.

The electric oven 2 is placed on a heat-insulating scale pan 4 of the electronic scale 5 for heating the cooker 1. A power socket 21 is disposed on one side of the oven 2. A double-plug power cable 3 is used to connect the oven 2 with the electronic scale 5 to control powering on/off of the oven 2.

The electronic scale 5 via the pressure of the scale pan 4 measures the corresponding actual weight. The scale pan 4 is heat-insulating, serving to isolate the high temperature of the electric oven 2 from the electronic scale 5 and protect the electronic scale 5 from being damaged. The electronic scale 5 has socket-type weight measuring posts 51. Corresponding supporting pillars 41 are disposed on bottom face of the scale pan 4 and inserted in the weight measuring posts 51. A power socket 52 is disposed on one side of the electronic scale 5 for plugging therein the double-plug power cable 3. A light-emitting switch 53 is arranged beside the power socket 52 is manually operable for controlling powering on/off of the electric oven 2. A main power cable 6 is disposed on the other side of the electronic scale 5 for connecting with external power supply. The front face of the electronic scale 5 is arranged with a controlling panel 54 including a display 55, a setting key 56, a weight increasing key 57, a weight decreasing key 58 and a clearing key 59. The controlling panel 54 is used to control the operation of the quantitative cooking device.

Figure 2:
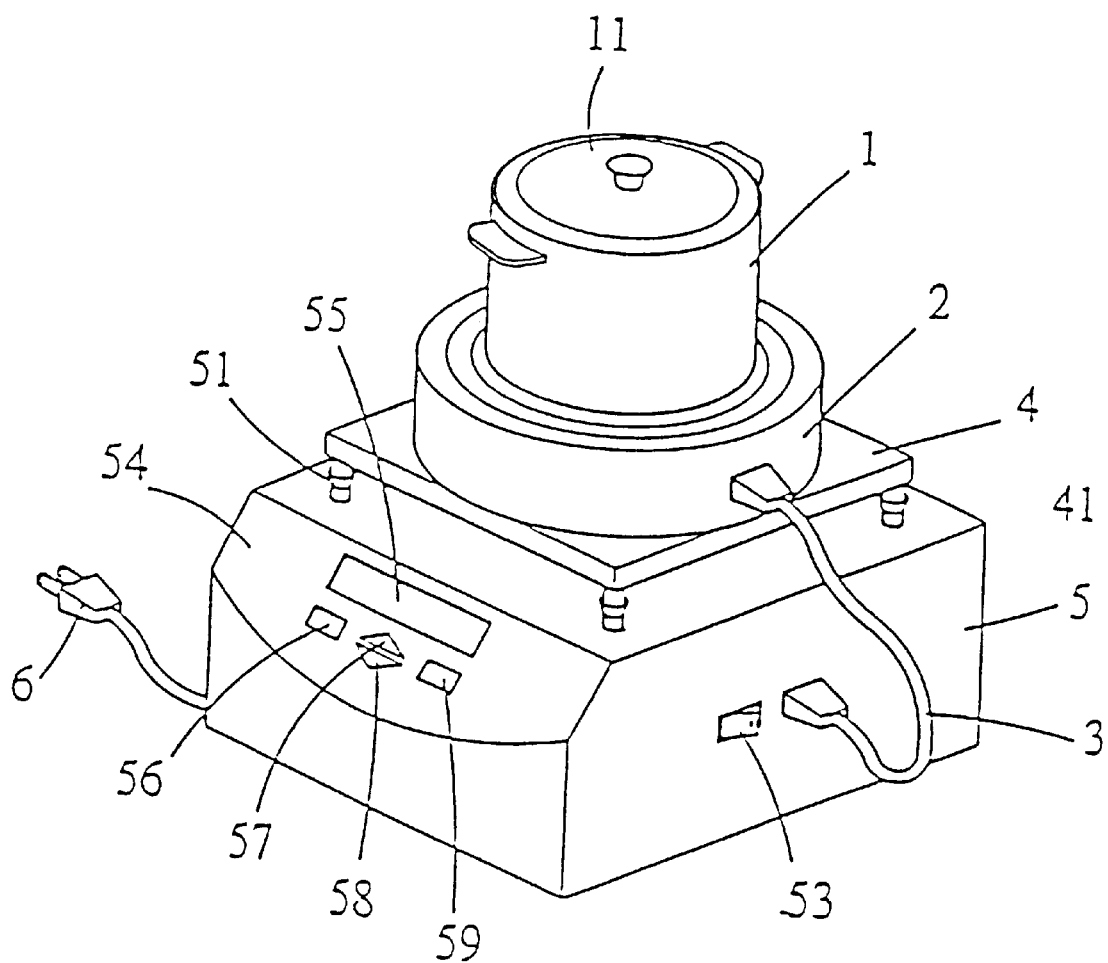
FIG. 2 is a perspective assembled view of the quantitative cooking device of the present invention.

FIG. 2 shows the assembly of the quantitative cooking device of the present invention. After the main power cable 6 is plugged, the display 55 will show two lines of numerals. When the setting key 56 is not yet pressed down or the clearing key 59 is pressed down, the electronic scale 5 serves as a common electronic scale for weighing. At this time, the shown numerals will be the same. When the setting key 56 is pressed down, the shown upper line of numerals will be the set value. By means of the weight increasing key 57 and the weight decreasing key 58, the set value can be adjusted. The lower line of numerals are the actual total weight. The upper line of preset value cannot be larger than the lower line of actual total weight. After the setting is completed and a certain amount of water is added, the light-emitting switch 53 is turned on and the electric oven 2 starts to heat the cooker 1. When the actual weight is equal to the preset value, the electric oven 2 is powered off to stop heating the cooker 1. Therefore, a quantitative cooking function can be achieved according to the preset value.

According to the above arrangement, by means of the controlling panel 54, the weight can be preset for cutting off the power as necessary in cooking foods. For example, when cooking herbal medicine, a certain amount of herbal medicine and a certain amount of water desired to be obtained ( such as two bowls of water) are added into the cooker 1. Under such circumstance, the preset value is the total weight of the herbal medicine, two bowls of water, cooker 1 and electric oven 2. After the setting key 56 is pressed, the weight increasing key 57 can be further pressed to slightly increase an error value ( the herbal medicine is water-absorbent). Then a certain amount of water is added into the cooker 1 for vaporization. ( For example, three more bowls of water is added.) Then the switch 53 is turned on to make the electric oven 2 start to heat the cooker 1. During heating procedure, the water in the cooker 1 will continuously vaporize. Accordingly, the lower line of actual total weight of the display 55 will be decreased. The electronic scale 5 will compare the preset value with the actual total weight. When the two values are equal to each other, the electronic scale 5 will turn off the switch 53 and cut off the power for the electric oven 2. At this time, the cooking is completed and just two bowls of liquid medicine can be poured out for drinking.

The present invention has the following advantages:

1. When cooking, it is unnecessary for a user to take care beside the cooker. When the cooking is completed, the power will be automatically cut off. Therefore, it is convenient for a user to cook the herbal medicine or the foods.
2. In normal state, the present invention can be used as an electronic scale.
3. The completion of cooking is judged by means of comparing the preset value with the actual total weight so that the result of cooking can be easily controlled.

The above embodiment is only used to illustrate the present invention, not intended to limit the scope thereof. Many modifications of the above embodiment can be made without departing from the spirit of the present invention.

What is claimed is:

1. A quantitative cooking device comprising a heater and an electronic scale, wherein:

the heater is located on a scale pan of the electronic scale for heating and cooking foods, the heater being electrically connected with the electronic scale to control powering the heater on and off; and the electronic scale via pressure on the scale pan measures actual weight of food placed on the heater and includes, a controlling panel in which a weight value is preset for cutting off the power to the heater, whereby when the measured actual weight is larger the preset weight value, the heater is continuously powered on, and when the measured actual weight is equal to or smaller than the preset weight value, the heater is powered off to stop heating the foods thereon.

2. The quantitative cooking device as claimed in claim 1, wherein the controlling panel includes a display, a setting key, a clearing key, a weight increasing key and a weight decreasing key.

3. The quantitative cooking device as claimed in claim 1, wherein the preset weight value for cutting off the power is a total of the weight of the foods desired to be obtained and the weight of the heater.

4. The quantitative cooking device as claimed in claim 1, wherein the scale pan of the electronic scale is heat-insulating.

5. The quantitative cooking device as claimed in claim 1, further comprising a container placed on the heater containing therein food to be cooked.

6. The quantitative cooking device as claimed in claim 2, further comprising a container placed on the heater containing therein foods to be cooked.

7. The quantitative cooking device as claimed in claim 4, further comprising a container placed on the heater containing therein foods to be cooked.

8. The quantitative cooking device as claimed in claim 5, wherein the preset weight value for cutting off the power is a total of the weight of the foods desired to be obtained, the weight of the heater and the weight of the container.

9. The quantitative cooking device as claimed in claim 6, wherein the preset weight value for cutting off the power is a total of the weight of the foods desired to be obtained, the weight of the heater and the weight of the container.

10. The quantitative cooking device as claimed in claim 7, wherein the preset weight value for cutting off the power is a total of the weight of the foods desired to be obtained, the weight of the heater and the weight of the container.

\* \* \* \* \*